United States Patent
Leung et al.

(10) Patent No.: US 7,945,578 B2
(45) Date of Patent: May 17, 2011

(54) OPTIMIZING SCALAR SEARCH IN A TEXT INDEXING AND SEARCH SERVER

(75) Inventors: Ting Yu Leung, San Jose, CA (US); Andreas Neumann, Gilroy, CA (US); Pradhan Gyanaranjan Pattanayak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/144,091

(22) Filed: Jun. 23, 2008

(65) Prior Publication Data

US 2009/0319485 A1    Dec. 24, 2009

(51) Int. Cl.
*G06F 17/30* (2006.01)
(52) U.S. Cl. ...................................... 707/769
(58) Field of Classification Search .................. None
See application file for complete search history.

(56) References Cited

U.S. PATENT DOCUMENTS

| 5,410,693 | A | 4/1995 | Yu et al. |
| 6,341,281 | B1 * | 1/2002 | MacNicol et al. ............... 1/1 |
| 7,024,406 | B1 | 4/2006 | Kunisetty et al. |
| 7,660,818 | B2 * | 2/2010 | Lulu ...................... 707/999.104 |
| 2005/0171945 | A1 | 8/2005 | Colrain et al. |

FOREIGN PATENT DOCUMENTS

WO     WO 9520792      8/1995

OTHER PUBLICATIONS

Anonymous, "*Storing static information in pre-compiled source file allowing information to be used at run-time for data-base manager to process executable SQL statements*", RD 302003 A Jun. 10, 1989.

* cited by examiner

*Primary Examiner* — Cheryl Lewis
(74) *Attorney, Agent, or Firm* — Cantor Colburn LLP; Erin Ming

(57) ABSTRACT

Method, system, and computer program product for query processing are provided. In one implementation, the method comprises receiving a query that includes a full text portion. An invariant part of the full text portion is then compiled and stored. Additional queries received are executed by reusing the compiled invariant part.

20 Claims, 5 Drawing Sheets

OPTIMIZING SCALAR SEARCH IN A TEXT INDEXING AND SEARCH SERVER

BACKGROUND

The present invention relates to relational database management systems, and more specifically, to scalar text search optimization for relational database management systems.

The process of searching database systems, such as Relational Database Management Systems (RDBMS), Information Management Systems, and XML Store, may be facilitated using an external Text Indexing and Search Server (TISS). Full text search functionality to unstructured or semi-structured information may be provided by the TISS. The information in the database may be pushed or pulled to a TISS for indexing and searching.

Such searches may be requested by a user initiated Structured Query Language (SQL) query. This SQL query may contain relational, as well as full text, predicates. In response to such a query, a database system, such as a RDBMS, may compute the selectivity of the relational predicate and retrieve it from a TISS for the full text predicate. Based on the selectivity, a RDBMS optimizer may use a formula to select a query execution plan. This query execution plan may be, for example, a "table-value" plan or a "scalar" plan.

SUMMARY

Method, system, and computer program product for query processing are provided. In one implementation, the method comprises receiving a query, the query including a full text portion, compiling an invariant part of the full text portion of the query, storing the compiled invariant part of the full text portion, receiving additional queries, and executing the additional queries by reusing the compiled invariant part.

In another implementation, the system comprises a database management system, a text indexing and search server, and a communication path between the database management system and the text indexing and search server, the text indexing and search server including a storage component caching a compiled invariant part of a query received from the database management system, and the communication path being active throughout query processing to allow the text indexing and search server to communicate the compiled invariant part of the query to the database management system.

In a further implementation, the computer program product comprises a computer usable medium having computer usable program code embodied therewith, the computer usable program code comprising computer usable program code configured to receive a query, the query including a full text portion, compile an invariant part of the full text portion of the query, store the compiled invariant part of the full text portion, receive additional queries, and execute the additional queries by reusing the compiled invariant part.

DETAILED DESCRIPTION

Implementations of the invention provide optimized scalar search in a text indexing and search server. These implementations provide a number of optimizations, which may be done in a text indexing and search server (TISS). These optimizations may include pre-compiling and reusing the invariant part of a full text query over the entire execution of the query. Also implementations of the invention may perform a query expansion for certain expensive queries like wildcard, fuzzy, etc. This expansion may be done once for the invariant part in the beginning of the execution of the query. This expansion may be reused over the entire execution of the user query. Furthermore, in implementations of the invention, the TISS may maintain an active connection with the RDBMS for the duration of the query processing for keeping the precompiled part of the query active and the posting list (which is a data structure that keeps a list of document identifiers and offsets for a given search term in the lexicon) open during query evaluation time. These optimizations may be performed by the TISS. As a result, the re-computation or re-execution of an invariant query may be avoided and the speed of the entire result set materialization may be increased, as compared with prior systems.

Figure 1:
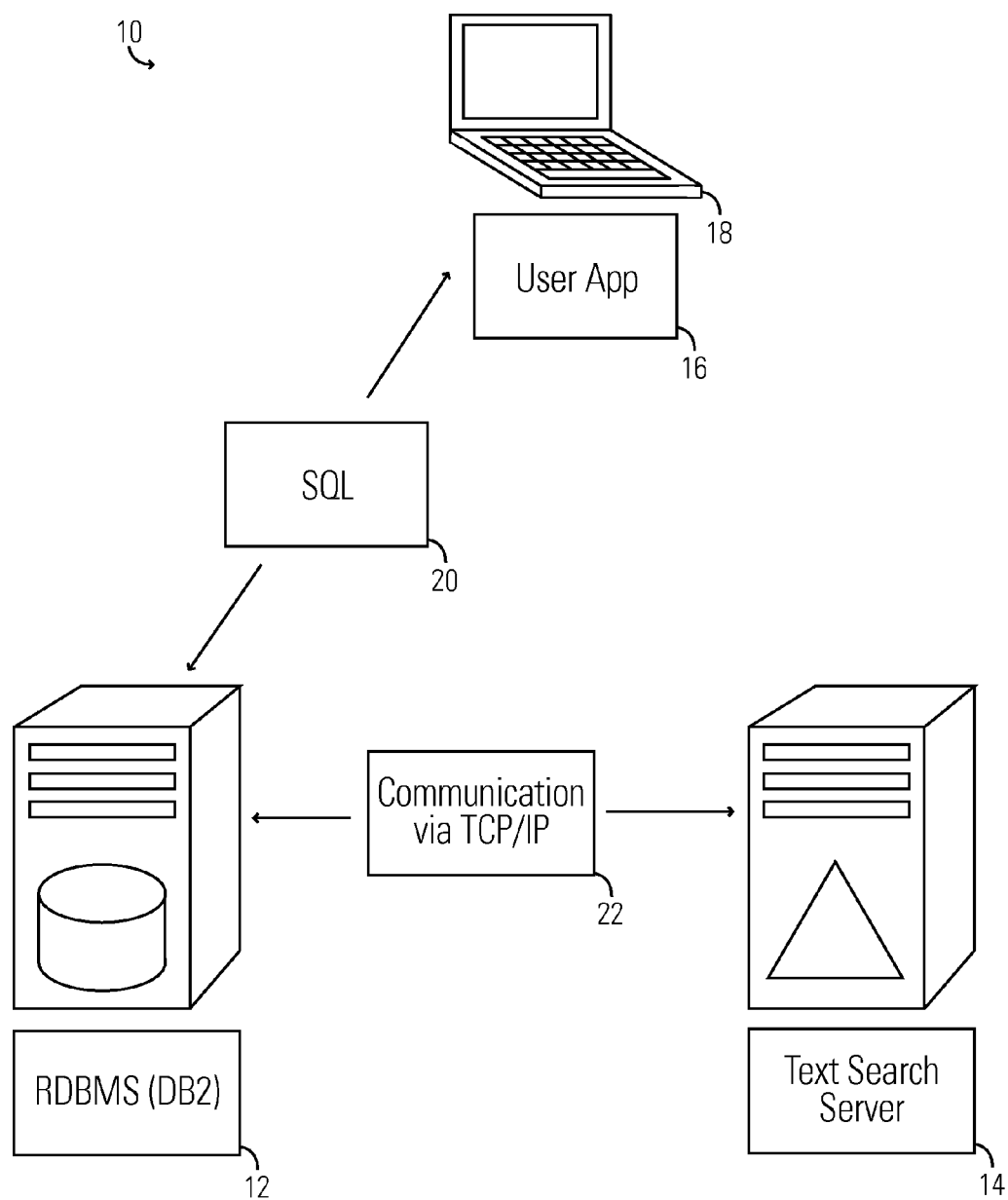
FIG. 1 depicts the architecture of a system 10 in accordance with an implementation of the invention.

FIG. 1 depicts the architecture of a system 10 in accordance with an implementation of the invention. The system 10 includes a database system, such as a relational database management system (RDBMS) 12 and a TISS 14. The RDBMS 12 may contain a user table which has a full text column. For example, in one implementation, a column may contain job applicant resumes in PDF format. The data from such a column can be indexed to provide full text search functions. The TISS 14 may build the full text index by processing the data being pushed by the RDBMS 12, or pulled from the RDBMS 12.

A user application 16 residing at a user computer 18 is connected to the RDBMS 12 via structured query language (SQL) connection 20. Typically, a user query may involve regular parametric columns in the RDBMS 12 and some free-form text queries. For example, a user may want to find all job applicants who live in 'California' and have a job skill of 'zOS'. In this example, the free-form text query 'zOS' is to be executed by the TISS 14 engine. A list of qualified rows will be returned to the RDBMS 12 by the TISS 14 for further processing (i.e., the result from the TISS 14 will further participate in the relational query evaluation plan.)

In the system 10, full text data will be processed and indexed by the TISS 14. The RDBMS 12 will send the full-text query to the TISS 14 for processing. The returned results will further be processed by the RDBMS 12 for such processes as joining with other tables.

In more detail, a user sends an SQL query 20 from the user application 16 to the RDBMS 12. This query may comprise both relational and full text predicates. In response, the RDMS engine computes the estimate of the result set for the relational part of the query. The TISS 14 may send the RDBMS 12 an estimate of the result set for the full text predicate. Based on a formula, known to those skilled in the art, a query optimizer in the RDBMS 12 will select either a 'scalar' or 'table-value' plan for execution.

In the following discussion a full-text query is referred to as "FT-Q". Note that FT-Q may be part of the end user SQL query or may be derived from the end user SQL query that is being sent to the TISS 14.

Where the RDBMS 12 selects a 'table-value' query plan, the full-text query FT-Q will be sent to the TISS 14. That is, the TISS will actually receive the following text search query:

FT-Q

Once the TISS 14 receives the FT-Q, the TISS 14 will compile and execute the query, and stream out the qualified result set, which comprises of the document identifier (DOCID) of the qualified rows, or equivalently the key or row identifier (ROWID) of the rows, to the RDBMS 12. These results are further joined by the RDBMS 12 engine with the results from the relation part of the end user query.

Where the RDBMS 12 selects a 'scalar' query plan, the RDBMS 12 will fetch a number of rows in sequence. For each row, the full-text query FT-Q will be sent to the TISS 14 together with a document identifier (DOCID) of the row, or equivalently the key or row identifier (ROWID) of the row. In other words, the TISS will actually receive the following text search query:

FT-Q and DOCID

Upon receiving the above query, the TISS 14 will search for documents satisfying FT-Q and, at the same time, match only the document with the document identifier DOCID. The TISS 14 will return either true or false to the RDBMS 12, indicating that there is a match (true) or there is no match (false). The RDBMS 12 will repeatedly send the same search query, FT-Q, but with a different document identifier. This kind of text search query is called 'Scalar Text Search' query. In this mode of operation, it is evident that FT-Q is an invariant text search query for each row being processed, that is, FT-Q remains unchanged. The present invention utilizes this fact to optimize this kind of text search query.

Generally speaking, the RDBMS 12 may choose a 'scalar' plan for execution when the query optimizer expects the number of qualified rows from the TISS 14 is relatively small. Instead of streaming many DOCIDs from the TISS 14 to RDBMS 12 and then requiring a join with the base table for further processing, it may be more efficient to send a few 'Scalar Text Search' queries to the TISS 14. In one extreme, we suppose only one row is qualified. In the 'table-value' plan, the text search query is sent to the TISS 14 which may return many rows, which are then joined with the base table. In the 'scalar' plan, the 'Scalar Text Search' query is sent to the TISS 14 only once with the qualified DOCID and the TISS 14 is asked to return either 'true' or 'false'. In this situation, it is clear that the 'scalar' plan is more efficient.

Note that when the end user issues multiple SQL queries to the system, the full text search queries may remain unchanged among the consecutive SQL queries. The following example illustrates the idea:

SELECT*FROM Candidate WHERE City=? and contains (ResumeDoc, 'zOS')

The above query looks for candidates with the 'zOS' skill and in a particular city. The user looks for a few cities, but the full text search query ('zOS') remains unchanged during the execution of these SQL queries. Implementations of the present invention uses the TISS 14 to optimize the query execution in 'scalar' mode, as described in the following section.

At the beginning of the full text search query evaluation, a persistent connection 22 is established by the RDBMS 12 with the TISS 14. This connection 22 may be, for example, a Transmission Control Protocol/Internet Protocol (TCP/IP) connection. The RDBMS 12 engine sends a series of queries on this connection. In the 'scalar' mode, the query contains a key and full text predicate. The keys belong to the result set of the relational part of the end user query and they are different for each query, whereas, the full text predicate is invariant across the series of queries sent by the RDBMS 12. In order to process the full text query, the TISS 14 goes through a sequence of operations such as, language detection, query parsing, tokenization and expansion, and finally query evaluation. It will be appreciated that these operations are computationally expensive.

In accordance with implementations of the invention, to more efficiently process such a request, the invariant part of the full text query is compiled when the first request is received. This compiled information is maintained by the TISS 14 as part of the session data associated with the persistent connection. This compiled information is then used to replace the full text part of queries received from the RDBMS 12.

In addition to pre-compilation, at this point, implementations of the invention may also start to prepare the query for execution. This preparation may also include the following four steps to accomplish posting list persistence:

1. Every term that appears in the query may be looked up in the index's lexicon.
2. Certain terms, such as wildcard and fuzzy terms, may undergo query expansion—that is, they are replaced with an OR of multiple terms from lexicon.
3. The lexicon may return term statistics, which are used to compute a normalized scoring weight for every query term.
4. The lexicon may also point to the posting list for each term. This posting list should be opened before the query evaluation begins.

The present invention can perform these four operations only once, for the first scalar invocation. Subsequent scalar invocations can reuse the weights and posting lists from the previous call.

The notion of a session, as described below, includes the entire duration of the scalar plan execution. The posting list may be kept open through this session to speed up the query materialization. For queries such as wildcard, fuzzy, etc. which need expensive query expansion at the execution time, caching the expanded query at the beginning helps to speed up the result set materialization.

As discussed above, a persistent connection between the TISS 14 and the RDBMS 12 is kept though the duration of the scalar plan execution. The session data is associated with such a connection. Normally, the session data is reclaimed when the session ends. This happens when the RDBMS 12 returns the final results to the user. In order to detect any abnormal hang at the RDBMS, a timer may be associated with the connection by the TISS 14. The session data may be reclaimed at the expiry of this timer.

Figure 2:
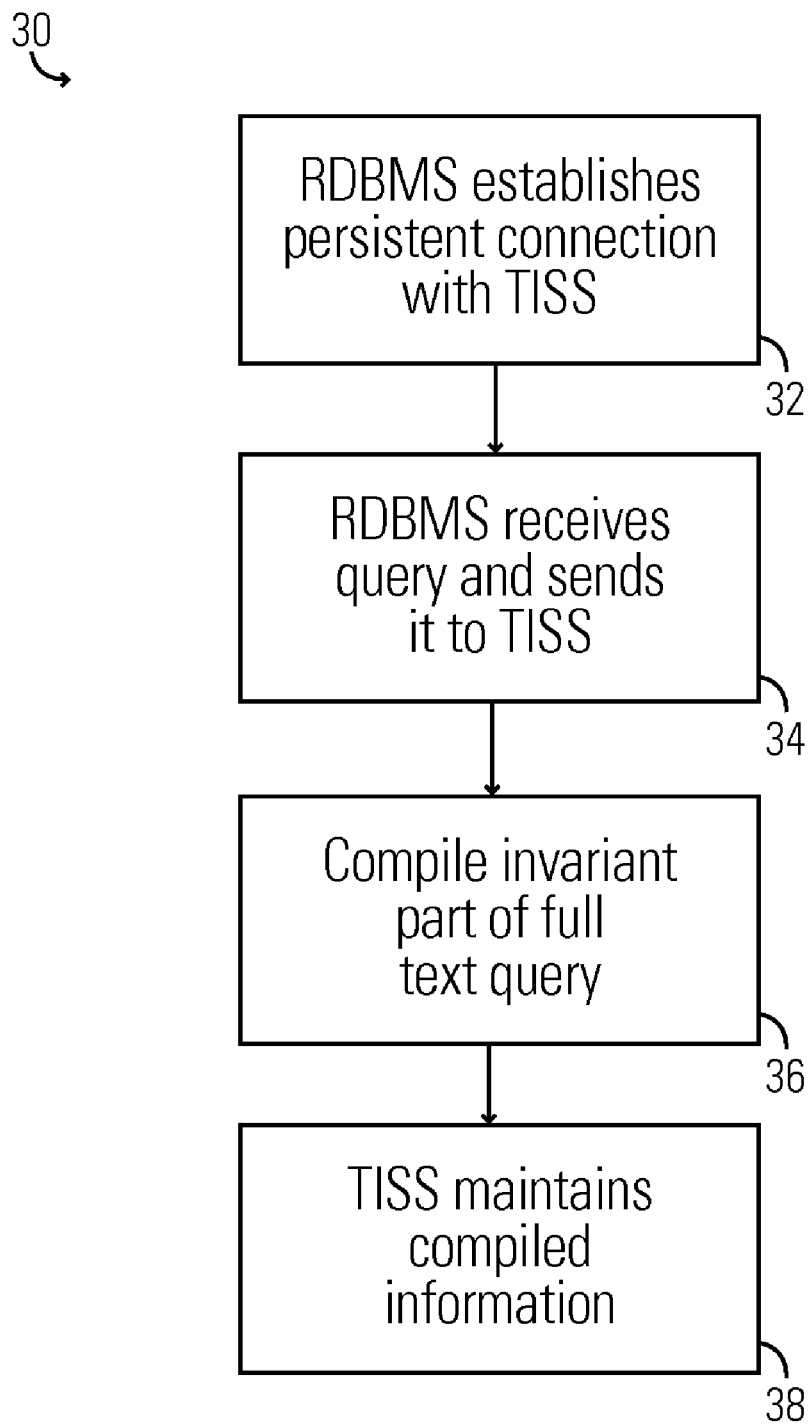
FIG. 2 is a flow chart of a pre-compiling process in accordance with an implementation of the invention.

Referring now to FIG. 2, there is shown a method 30 of performing pre-compilation of a query in accordance with an implementation of the invention. In step 32, a persistent connection is established by the RDBMS 12 and the TISS 14. In step 34, the RDBMS 12 receives the query and sends it to the TISS 14. The invariant part of the query is then compiled by the TISS 14, in step 36, and the compiled information is maintained, in step 38.

Figure 3:
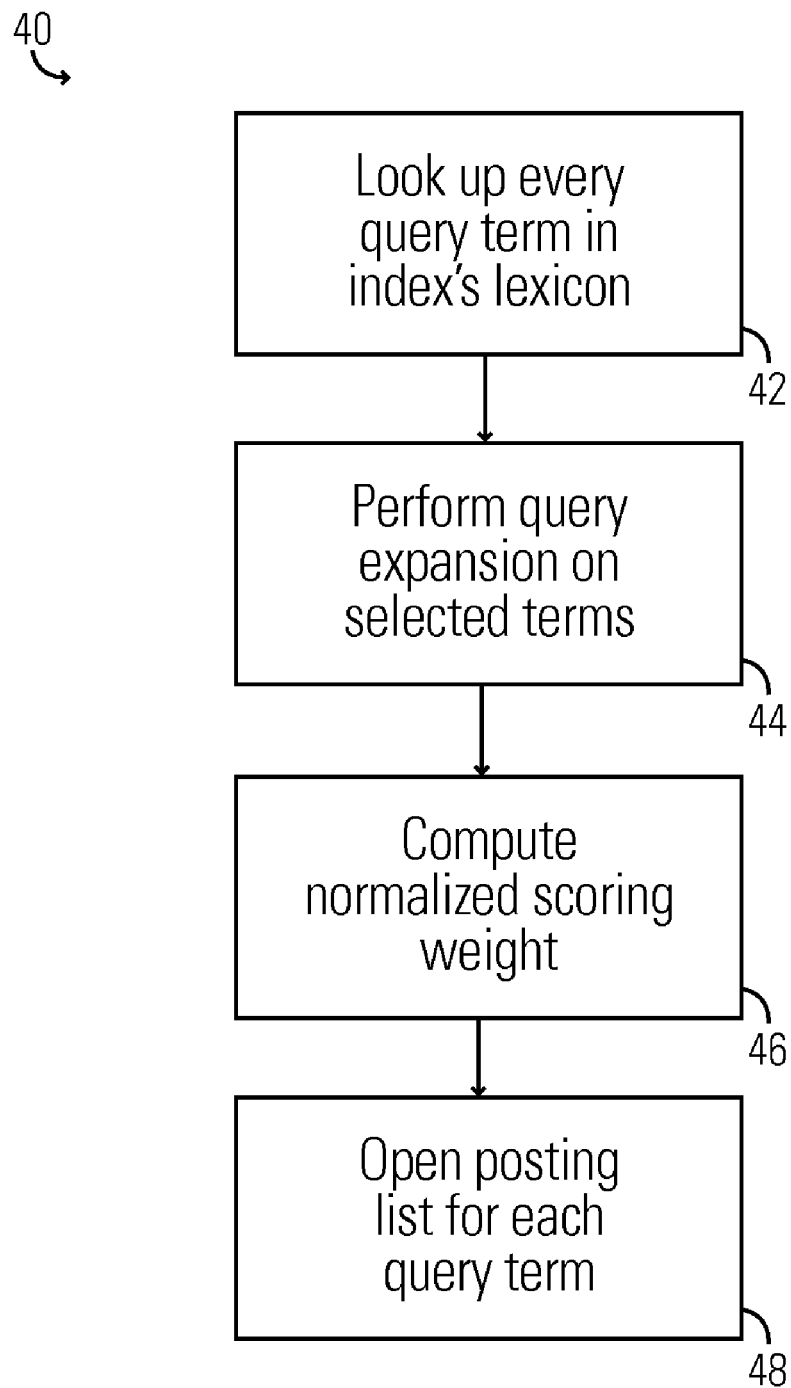
FIG. 3 is a flow chart of a process for preparing a query for execution in accordance with an implementation of the invention.

FIG. 3 shows a method 40 of preparing the query for execution in accordance with an implementation of the invention. In step 42, every term that appears in the query is looked up in the index's lexicon. In step 44, query expansion is performed on selected terms, such as wildcard and fuzzy terms. The lexicon then returns term statistics that are used to compute a normalized scoring weight for every query term, in step 46. In step 48, a posting list for each term is then opened, which must be done before query evaluation can begin.

Figure 4:
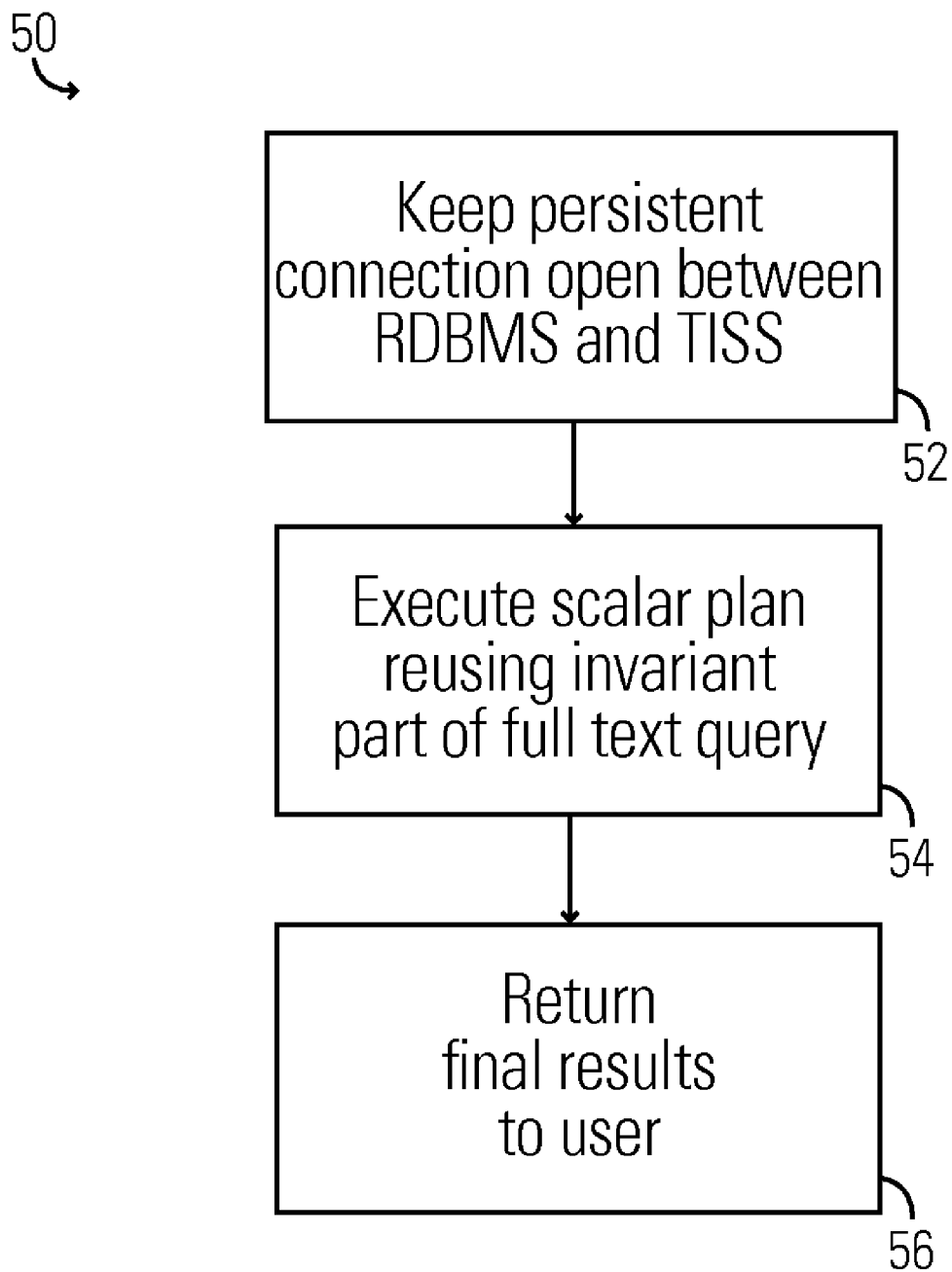
FIG. 4 is a flow chart of a process for executing a query in accordance with an implementation of the invention.

FIG. 4 shows a method 50 of executing a query plan in accordance with an implementation of the invention. The persistent connection between the RDBMS 12 and the TISS 14 is kept open throughout the scalar plan execution, as shown in step 52. In step 54, the scalar plan is executed such that invariant parts of the full text query are reused. When execution is complete, the final results are then returned to the user, in step 56.

The 'scalar' query plan benefits from the techniques because a sequence of 'Scalar Text Search' queries will be sent to the TISS for processing and the queries only differ by the DOCID. As such, the text search query performance is greatly enhanced. In the situation of the 'table-value' query plan, only one query will be sent to the TISS by the RDBMS. End users may certainly submit different text search queries but there may not be any common invariant portion of the queries such that the above techniques can be used to enhance the system performance.

As can be seen from the above disclosure, implementations of the invention provide a way to optimize scalar search in a TISS. This is done by pre-compiling and reusing the invariant part of the full text query over the entire execution of the query. This is further facilitated by having the TISS maintain an active connection with the RDBMS for the duration of the query processing. This keeps the precompiled part of the query active and the posting list open. As a result, the speed of query materialization is significantly improved.

As will be appreciated by one skilled in the art, the present invention may be embodied as a system, method or computer program product. Accordingly, the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
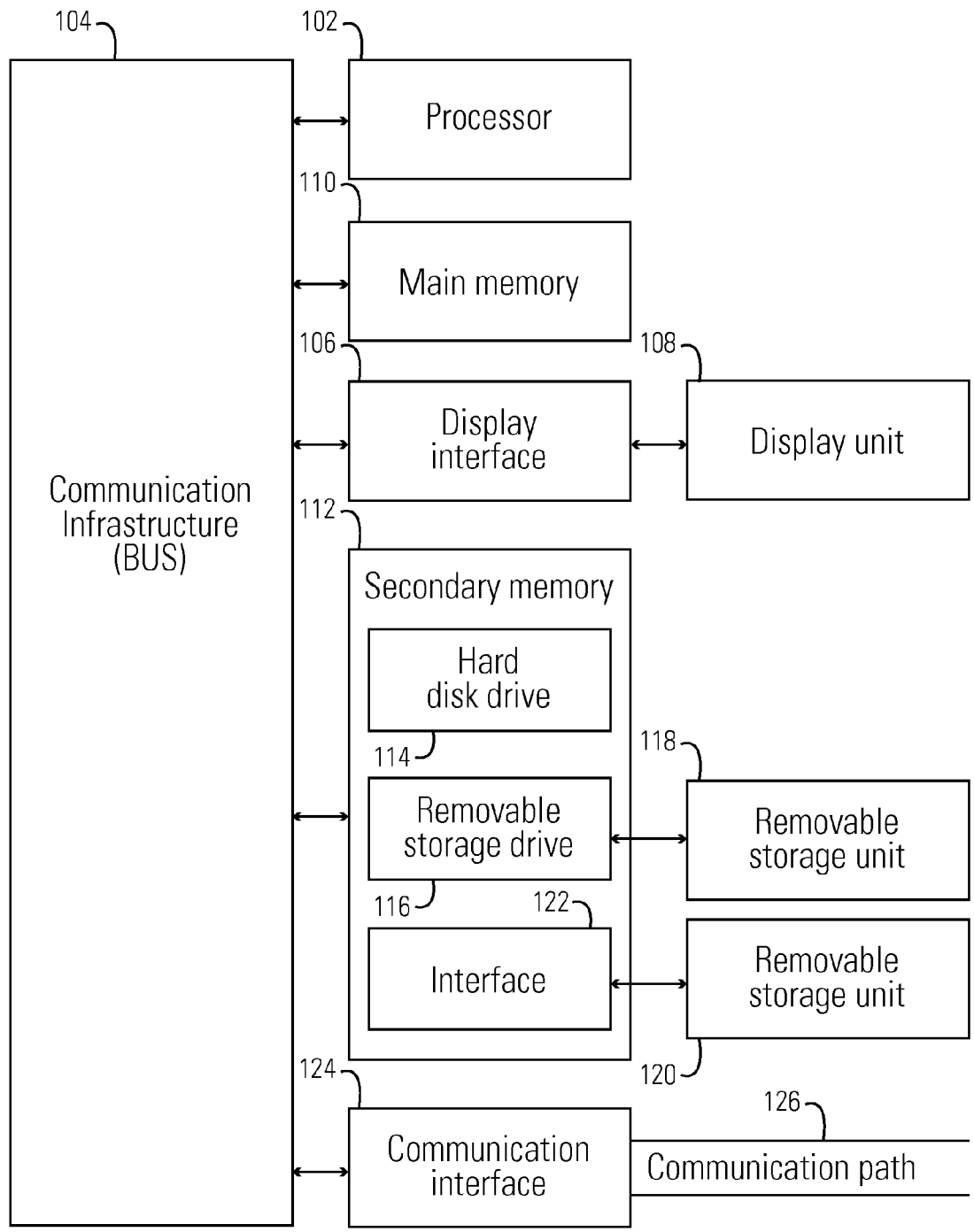
FIG. 5 shows a high level block diagram of an information processing system useful for implementing one implementation of the present invention.

FIG. 5 is a high level block diagram showing an information processing system useful for implementing one implementation of the present invention. The computer system includes one or more processors, such as processor 102. The processor 102 is connected to a communication infrastructure 104 (e.g., a communications bus, cross-over bar, or network). Various software implementations are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative implementations, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the various embodiments of the invention. References in the claims to an element in the singular is not intended to mean "one and only" unless explicitly so stated, but rather "one or more." All structural and functional equivalents to the elements of the above-described exemplary implementation that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

What is claimed is:

1. A method for query processing, the method comprising:
  receiving a query, the query including a full text portion;
  compiling an invariant part of the full text portion of the query;
  storing the compiled invariant part of the full text portion;
  receiving additional queries; and
  executing the additional queries by reusing the compiled invariant part.

2. A method according to claim 1 further comprising:
establishing a persistent connection between a relational database management system and a text indexing and search server; and
maintaining the persistent connection throughout execution of the additional queries.

3. A method according to claim 2 wherein compiling of the invariant part and storing of the compiled invariant part are performed by the text indexing and search server.

4. A method according to claim 1 wherein the query comprises search terms and the method further comprises looking up every search term in the query in an index lexicon.

5. A method according to claim 4 further comprising performing query expansion on selected ones of the search terms.

6. A method according to claim 5 further comprising computing a normalized scoring weight for each of the search terms.

7. A method according to claim 6 further comprising generating and opening a posting list for each of the search terms.

8. A method according to claim 7 wherein execution of the additional queries comprises reusing the query expansion, the normalized scoring weight, and the posting lists.

9. A method according to claim 1 further comprising generating a scalar query plan, wherein execution of the additional queries comprises executing the scalar query plan.

10. A method according to claim 1 further comprising generating a table-value query plan, wherein execution of the additional queries comprises executing the table-value query plan.

11. A system for query processing, the system comprising:
a database management system;
a text indexing and search server; and
a communication path between the database management system and the text indexing and search server,
the text indexing and search server including a storage component caching a compiled invariant part of a query received from the database management system, and
the communication path being active throughout query processing to allow the text indexing and search server to communicate the compiled invariant part of the query to the database management system.

12. A system according to claim 11 wherein the compiled invariant part of the query comprises normalized scoring weights for each term in the query.

13. A system according to claim 11 wherein the compiled invariant part of the query comprises a query expansion.

14. A system according to claim 11 wherein the compiled invariant part of the query comprises a posting list for each the query term.

15. A computer program product for query processing, the computer program product comprising a computer usable storage medium having computer usable program code embodied therewith, the computer usable program code comprising computer usable program code configured to:
receive a query, the query including a full text portion;
compile an invariant part of the full text portion of the query;
store the compiled invariant part of the full text portion;
receive additional queries; and
execute the additional queries by reusing the compiled invariant part.

16. A computer program product according to claim 15 wherein the computer usable program code is further configured to:
establish a persistent connection between a relational database management system and a text indexing and search server; and
maintain the persistent connection throughout execution of the additional queries.

17. A computer program product according to claim 16 wherein compiling of the invariant part and storing of the compiled invariant part are performed by the text indexing and search server.

18. A computer program product according to claim 15 wherein execution of the additional queries comprises reusing a query expansion, a normalized scoring weight, and a set of posting lists.

19. A computer program product according to claim 15 wherein the computer usable program code is further configured to:
generate a scalar query plan, wherein execution of the additional queries comprises executing the scalar query plan.

20. A computer program product according to claim 15 wherein the computer usable program code is further configured to generate a table-value query plan, wherein execution of the additional queries comprises executing the table-value query plan.

* * * * *